(12) United States Patent
Kaastra

(10) Patent No.: US 7,257,321 B2
(45) Date of Patent: Aug. 14, 2007

(54) DEVICE FOR HEATING LIQUIDS

(75) Inventor: Simon Kaastra, Dinxperlo (NL)

(73) Assignee: Ferro Techniek Holding B.V. (NL)

( * ) Notice: Subject to any disclaimer, the term of this patent is extended or adjusted under 35 U.S.C. 154(b) by 0 days.

(21) Appl. No.: 10/569,850

(22) PCT Filed: Aug. 31, 2004

(86) PCT No.: PCT/NL2004/000605

§ 371 (c)(1),
(2), (4) Date: Feb. 27, 2006

(87) PCT Pub. No.: WO2005/020767

PCT Pub. Date: Mar. 10, 2005

(65) Prior Publication Data

US 2007/0000906 A1 Jan. 4, 2007

(30) Foreign Application Priority Data

Sep. 1, 2003 (NL) .................................. 1024204

(51) Int. Cl.
*F24H 1/18* (2006.01)
(52) U.S. Cl. .................. 392/459; 392/498; 219/441
(58) Field of Classification Search ............... None
See application file for complete search history.

(56) References Cited

U.S. PATENT DOCUMENTS 2,987,607 A * 6/1961 Paulin ..................... 219/442
3,784,788 A * 1/1974 Fourny ..................... 219/441
4,278,873 A * 7/1981 Petrides .................... 219/501
4,360,726 A * 11/1982 Haden ...................... 219/441
4,539,468 A * 9/1985 Phillips et al. ............. 392/447
4,544,830 A * 10/1985 Miller ...................... 392/447
4,645,910 A * 2/1987 Chhatwal .................. 219/437
5,693,244 A * 12/1997 Pragt et al. ................ 219/441

FOREIGN PATENT DOCUMENTS

| EP | 0 380 369 A | 8/1990 |
| GB | 1 095 161 | 12/1967 |
| GB | 2 153 190 A | 8/1985 |
| GB | 2 346 738 A | 8/2000 |

* cited by examiner

Primary Examiner—Thor S. Campbell
(74) Attorney, Agent, or Firm—The Webb Law Firm

(57) ABSTRACT

The invention relates to a device for heating liquids, comprising: a liquid container, at least one electrical heating element connected to the liquid container for heating liquid received in the liquid container, at least one boiling sensor connected to, the inner side of the liquid container for detecting a boiling temperature in a part of the liquid container located above the liquid, at least one overheating sensor thermally connected to the heating element, and an electrical circuit in which the heating element, the boiling sensor and the overheating sensor are received such that a power supply to the heating element can be interrupted by the boiling sensor and the overheating sensor.

13 Claims, 4 Drawing Sheets

DEVICE FOR HEATING LIQUIDS

BACKGROUND OF THE INVENTION

1) Field of the Invention

The invention relates to a device for heating liquids and particularly to liquid containers having at least one heating element.

2) Description of the Prior Art

Devices for heating liquids, such as for instance kitchen equipment, laboratory equipment, rice cookers, water kettles and electric water kettles, generally comprise, in addition heating elements for heating the liquid, temperature-sensitive electrical circuits for the purpose of controlling the heating process and/or safeguarding the device against for instance overheating. A temperature-sensitive electrical circuit can for instance switch off a heating element when the heated liquid reaches a determined desired temperature. Another application is the use of a temperature-sensitive electrical circuit to prevent overheating of a heating element in the case an appliance is for instance switched on without liquid being present to which the heating element can transfer the heat.

The British patent GB 2 153 190 describes a method for manufacturing a device for heating water. The heating element described here is a substrate provided with an electrically insulating material on which a heater track is screen printed. The device is provided with a first temperature sensor for sensing steam and a second sensor for sensing a "boil dry" condition. In an embodiment variant the second sensor can be arranged adjacently of the heater track on the heating element. Thermistors are proposed as sensors.

A frequently applied alternative, for instance in water kettles, to a sensor in the form of a thermistor is formed by a bimetal switch which is thermally connected to a heating element, and can thus be used as safeguard against overheating. Such a bimetal switch for instance switches off the power supply to the heating element when the temperature of the heating element exceeds a determined value and/or switches the heating off when the heated liquid boils.

SUMMARY OF THE INVENTION

The present invention has for its object to provide a device for heating liquids, the heating element of which, in contrast to the prior art, can be activated in a reliable manner and at any desired moment.

The invention provides for this purpose a liquid container, characterized in that placed in parallel with a boiling sensor in an electric circuit is a time-controlled electric switch which, upon activation of the heating element, bypasses the boiling sensor for a determined time interval, irrespective of the state of the boiling sensor. This provides a user of the device with the option of heating the liquid for a determined (in practice probably short) time, such as for instance several seconds, if the boiling sensor does not allow the heating element to be switched on because the boiling sensor has too high a temperature. This may for instance occur in the period immediately after the heating element has been switched off because the liquid in the liquid container has been brought to the boil. After being activated, as a result of which the heating element is switched off, the boiling sensor will still remain hot for some time. Renewed switch-on of the heating elements is not immediately possible due to this relatively high temperature of the boiling sensor. A bimetal switch will only return after sufficient cooling to a state in which it makes activation of the heating element possible, and only after sufficient cooling will a thermistor acquire a resistance value which makes activation of the heating element possible. The operation of an activated overheating sensor can (and may) not be counteracted by the time-controlled electric switch. It is therefore necessary to avoid the time-controlled electric switch being placed in parallel with the overheating sensor. Deactivation of the overheating sensors could after all result in hazardous conditions, wherein the device could be heated to a temperature which is too high.

In a preferred variant the time-controlled electric switch can be manually operated, or at least switched on. A user of for instance a water kettle, shortly after it has been turned off because the water has been heated to boiling temperature, can thus bring the water to the boil once again without the boiling sensor hindering this. This is advantageous in practice because a user usually wishes to use boiled water immediately after it has been brought to the boil. In normal use it will be some time before the user reaches a water kettle once it has been turned off because the boiling temperature has been reached. The cooling of the boiled liquid in the meantime can be counteracted with the device according to the invention. For safety reasons the electric switch is only able to bypass the boiling sensor for a determined period (under time control). A permanent bypassing could otherwise result for instance in boiling dry of the heating element.

In a preferred embodiment the boiling sensor and the time-controlled electric switch placed in parallel therewith are arranged in a first power circuit, whereby a relay placed in a second circuit is actuated, in which second power circuit the heating element is also included. The use of separate power circuits can ensure that it is more readily possible to comply with the approval specifications required of the device. It is possible here for the overheating sensor to also be included in the first power circuit. It is also possible to supply the first and second power circuit with separate power supplies and/or at a different voltage level. Conversely, it is also possible to connect both power circuits to the same voltage source.

In addition, it may be advantageous if the boiling sensor and/or the overheating sensor both comprise at least one thermistor. A thermistor is a temperature-sensitive electrical resistance, examples being NTC and PTC resistors which are obtainable in many variants. A thermistor is in principle more robust than for instance a bimetal switch. A significant difference from a bimetal switch is that a thermistor does not contain any moving parts that are essential for operation. A thermistor can further have more compact dimensions. Both properties increase the freedom in design of the device. A device according to the invention with one or more thermistors is relatively very simple and inexpensive. A further advantage of applying thermistors is that the switching time of a thermistor can be very short. Such a short switching time has the advantage that a device will operate quickly (and thus relatively safely). In addition, it is advantageous that the thermistors function at low voltages and with low amperages; these need (and in practice will) not be incorporated in a main current circuit. Another advantage of the thermistors functioning at low voltages and with low amperages is that they can be embodied with a very small mass, and can thereby also operate with a very short time delay (low mass inertia). A short delay during switching (short switching time) results in the chance of overheating (consider for instance a blown fuse) being reduced considerably. A short time delay is also referred to as a "small time constant". Conversely, it is also possible to make use of small bimetal switches which likewise do not have to be incorporated in a main current circuit. It is precisely this non-inclusion of the thermistors (and/or small bimetal switches) in the main current circuit that provides extra freedom in the design of the device in which they are incorporated. A further additional advantage of applying thermistors is that it is possible to apply so-called multi-track elements, whereby a thermistor can for instance be paired with a plurality of surfaces of a heating element. It is not therefore the heating element as a whole that is safeguarded, but detection takes place on a smaller scale, on separate parts of the heating element. This also results in a quicker and more precise detection.

In addition to thermistors and/or bimetal switches, other electrical components can also be included in the electrical circuit, including for instance a leakage current switch, a leakage current sensor, a resistor, an electrical fuse, and electric light source, a measuring device, an integrated circuit (IC) and other components.

It is advantageous if the boiling sensor is thermally connected to the inner side of the liquid container at a location lying above a determined maximum liquid level of the liquid container. The boiling sensor will hereby substantially detect the temperature of the vapour above the liquid, thereby avoiding premature interruption of the power supply when non-homogeneous temperature fluctuations occur in the heated liquid. The vapour comes into contact with the sensor and thereby causes a temperature increase in the sensor, which results in detection of the boiling temperature. The temperature above the liquid will only rise significantly when the liquid boils and thus produces a relatively large amount of vapour. The above technical measure has the advantage that a relatively less accurate, inexpensive sensor can be applied for detection of the boiling temperature of the liquid.

In a non-limitative preferred embodiment, the boiling sensor is placed in a chamber connected to the liquid container such that the chamber is in communication with the liquid container above the maximum liquid level. The boiling sensor will hereby substantially measure the temperature of the vapour above the liquid. Because the boiling sensor is placed in the chamber, the boiling detection can be more reliable than outside the chamber, where fluctuations in temperature and splashes of boiling liquid make detection less precise.

It is advantageous when the boiling sensor is screened in medium-tight manner from the liquid container. On the one hand this prevents adverse effects of liquid in the liquid container on the boiling sensor and the electronic circuit connected thereto. On the other hand material from the boiling sensor is prevented from entering the liquid container (for instance through wear or being dissolved) and thus contaminating the liquid. The screening can be designed for instance by incorporating the boiling sensor in the line of a wall of the liquid container, although forms can also be envisaged where the boiling sensor is screened by an anti-splash plate, or where the boiling sensor is positioned in a tubular or capsule-like cover. The medium-tight material used for the screening can comprise for instance plastic, metal or ceramic.

In a particular non-limitative preferred embodiment of the present invention, the boiling sensor is located outside the liquid container, and the boiling sensor is in thermal contact with the inner side of the liquid container via a thermal conductor. The thermal conductor can for instance take the form of a wire or strip, preferably manufactured from a metal such as copper or aluminium. The thermal conductor can be partly covered with a thermally insulating layer, for instance in the form of an insulating strip, wrapping, tube or sleeve. This can make the heat conduction through the thermal conductor to the boiling sensor more efficient and heat is prevented from being conducted directly to the thermal conductor via the wall of the liquid container. The use of the thermal conductor provides an increased freedom of design for the device according to the invention because the sensor does not have to be situated at the measuring position, and can therefore be positioned at many locations. The interposing of the thermal conductor also provides improved options for protecting the boiling sensor from the adverse effects of liquid or liquid vapour.

It is useful if the device is provided with means with which the electric power to be fed to the heating element is limited. This provides an extra safety mechanism in addition to the protection by the overheating sensor. The power-limiting means can for instance be a fuse, a leakage switch or other commercially available power-limiting electronic component.

In a non-limitative preferred embodiment, the means with which the electric power to be fed to the heating element is limited comprise an additional power supply for connecting to the heating element and for activating by means of overheating. It is for instance possible here to envisage a plug pin connecting to the heating element (for instance a circuit arranged by means of print technique) via an insulating material melting at a determined temperature. When the insulating material melts a contact is realized whereby the heating element will fuse.

The boiling sensor connected to the inner side of the liquid container for detection of a boiling temperature of the liquid present in the liquid container can be placed in a part of the liquid container located above the liquid. Conversely, it is also possible to place the boiling sensor such that it will be situated in the liquid, for instance such that the temperature of the boiling sensor lags behind that of the liquid until the moment of boiling, when as a result of turbulence the temperature of the boiling sensor will increase rapidly (see GB 1095161 for an example of such an arrangement of a boiling sensor), incorporated herein by reference.

BRIEF DESCRIPTION OF THE DRAWINGS

The invention will be further elucidated hereinbelow with reference to several non-limitative exemplary embodiments, in which.

DETAILED DESCRIPTION OF THE PREFERRED EMBODIMENTS

Figure 1:
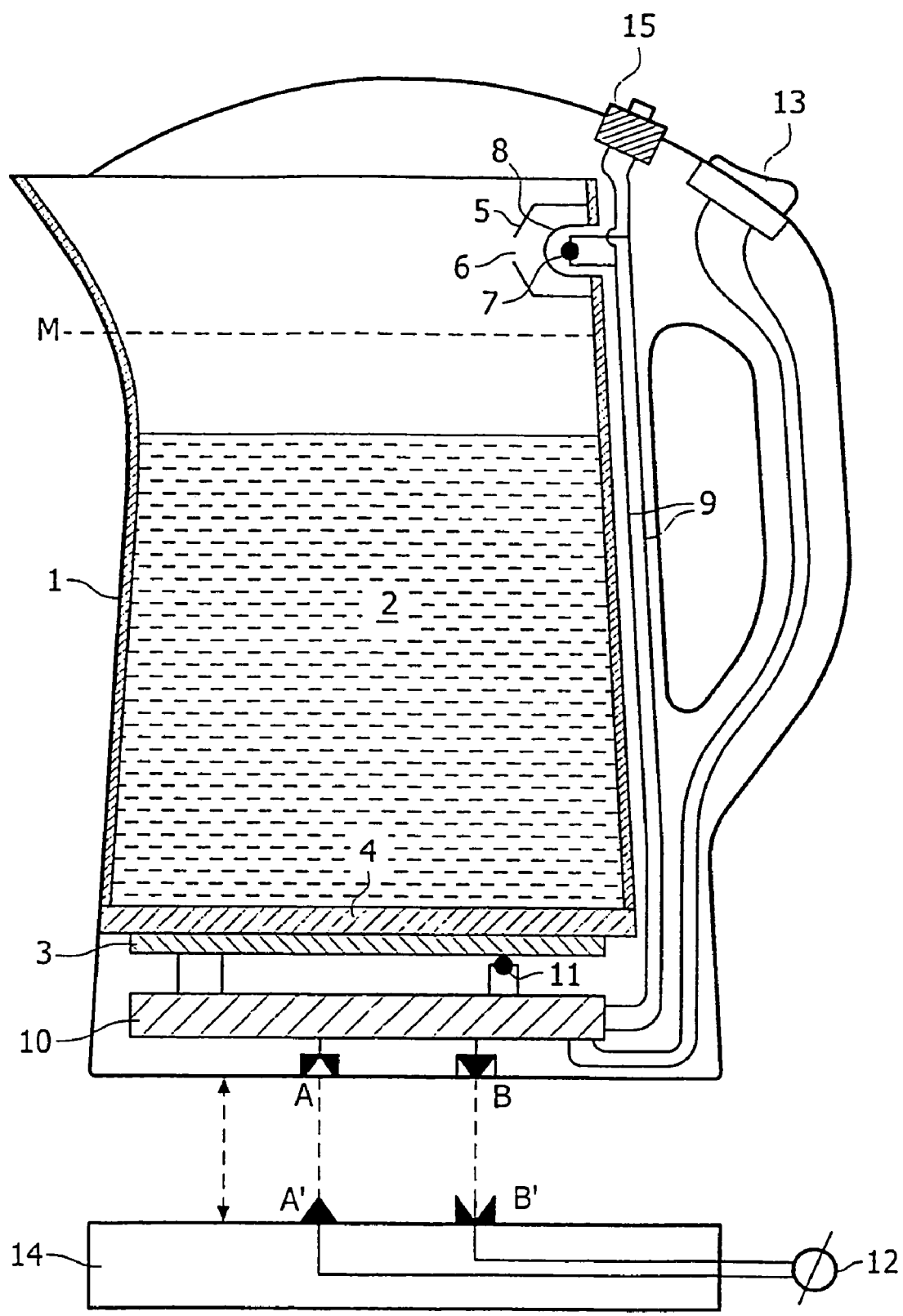
FIG. 1 is a cross-section through a device according to the present invention.

FIG. 1 shows a preferred embodiment of a device for heating liquids according to the present invention. The device is provided with a liquid container 1 in which the liquid 2 for heating can be received. The device is also provided with a heating element 3 which is in thermal contact with the liquid 2 for heating via a thermal conductor 4, in this case a metal plate. Situated above the intended maximum filling level (indicated with broken line M) of liquid container 1 is a semi-open chamber 5 provided with an opening 6 through which vapour from the liquid 2 can enter chamber 5. In chamber 5 is situated a thermistor 7 (or alternatively a bimetal switch 7) which functions as boiling sensor. A medium-tight layer 8 is arranged round thermistor 7 in order to protect thermistor 7 from the adverse effects of vapour. Thermistor 7 is connected by means of electric wiring 9 to an electrical circuit 10. Heating element 3 is thermally connected to a second thermistor 11 which functions as overheating sensor. This overheating sensor is likewise connected to electrical circuit 10. Electrical circuit 10 provides electric power supply to heating element 3 from power source 12 via a base plate 14 releasably connected to the device. Base plate 14 is connected to an external power source 12 and is provided with electric contact points A' and B' which, when the device is placed on this base plate 14, make electrical contact with the corresponding counter-contact points A and B arranged in the bottom of the device. The electrical circuit 10 is adapted to close the power supply to heating element 3 by switching off the on/off switch 13 when boiling sensor 7 senses hot vapour coming from boiling liquid 2. On/off switch 13 can be switched on by a user if heating or boiling of liquid 2 is desired. When liquid 2 reaches its boiling temperature, the released liquid vapour will heat the boiling sensor 7 such that boiling of the liquid 2 is detected. The power supply to heating element 3 will further be closed if overheating sensor 11 senses overheating. This may happen for instance when the device is switched on using switch 13 without liquid 2 being present in liquid container 1. Because heating element 3 cannot transfer any heat to liquid 2, the temperature will rise until the moment that overheating sensor 11 reaches a determined (overheating) temperature, wherein the electrical circuit 10 ensures that switch 13 is switched off, so that the power supply to heating element 3 is interrupted. It will be apparent that the set overheating temperature will be considerably higher than the boiling temperature of the liquid 2 for heating. If the heated liquid 2 is for instance water, electrical circuit 10 will switch off heating element 3 when boiling sensor 7 is heated for some time by a water vapour with a temperature of 90-100° C. The overheating temperature lies in general between 250 and 300° C. Disposed in parallel with boiling sensor 7 is a switch 15 with which a temporary connection can be made whereby boiling sensor 7 is bypassed. It thus becomes possible, in the case a boiling sensor 7 is activated by heat, to still supply power to heating element 3. Switch 15 is a time-controlled switch, which means that it will only be closed for a determined time after the moment of activation and is then (automatically) opened again. Shortly after boiling of liquid 2 has been stopped by boiling sensor 7, the liquid can once more be heated (brought to the boil again) by operating the switch 15.

Figure 2:
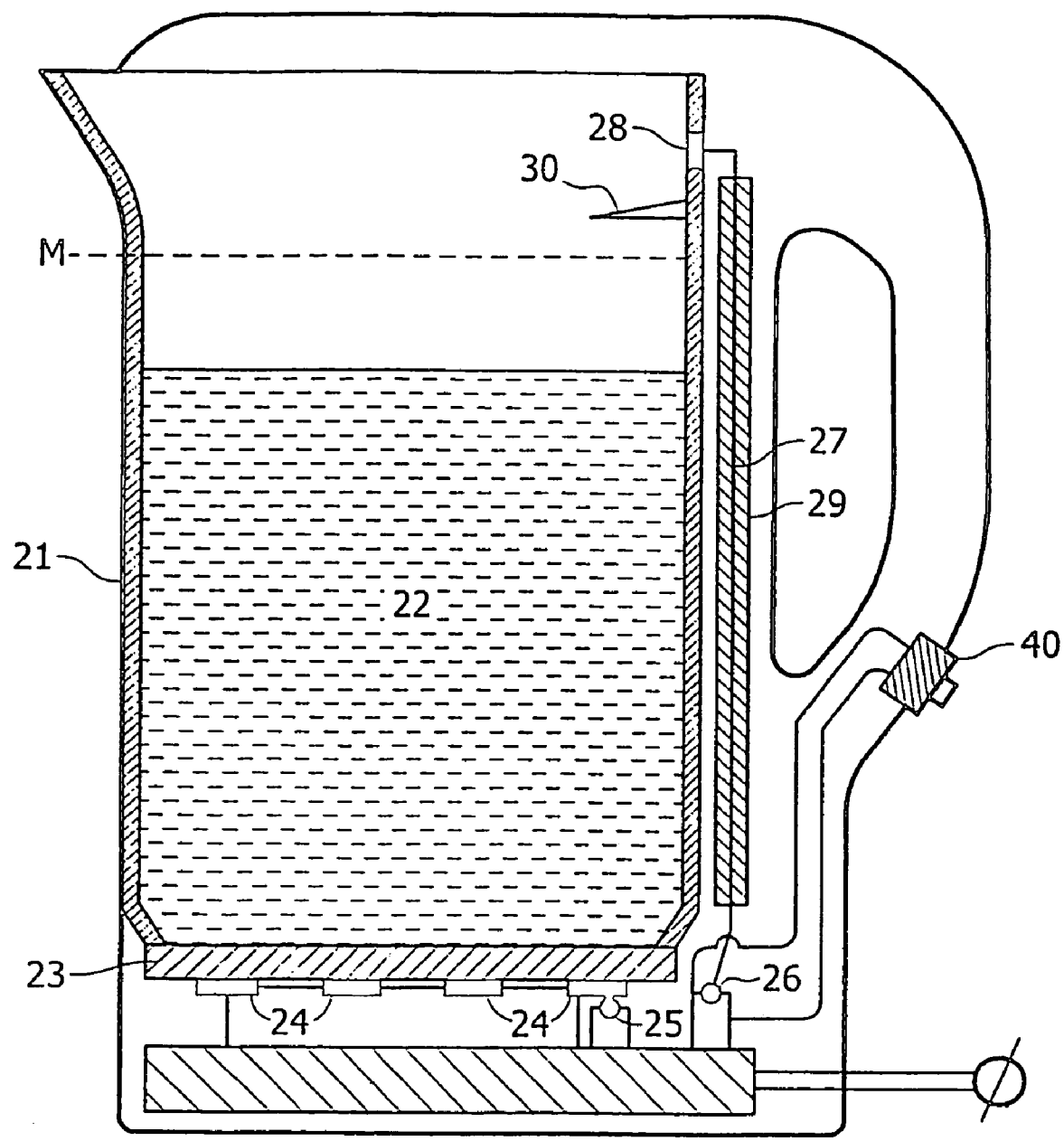
FIG. 2 is a cross-section through an alternative embodiment of a device according to the present invention, wherein the boiling sensor is located outside the liquid container.

FIG. 2 shows a schematic view of a second preferred embodiment according to the present invention. A liquid container 21 contains a liquid 22 for heating. Liquid 22 is heated by a plurality of heating elements 24 printed on the underside of a thermally conducting plate 23. The thermally conducting plate 23 prevents direct contact of heating elements 24 with the liquid 22 for heating. Conducting plate 23 also provides for heat distribution and an effective heat transfer from heating elements 24 to liquid 22. In this non-imitative preferred embodiment a thermistor 25, which functions as overheating sensor, is in direct thermal contact with heating elements 24; a change in the temperature of heating element 24 can thus be detected quickly. A second sensor 26 functions as boiling sensor and is placed outside liquid container 21. The second sensor 26 is in thermal contact with liquid container 21 via a thermal conductor 27. An outer end 28 of thermal conductor 27 debouches in a measuring position above the maximum filling level M of liquid container 21. Thermal conductor 27 is covered over a part of its length with a thermally insulating sleeve 29 which prevents direct transfer of heat from liquid 22 to thermal conductor 27 through the side wall of liquid container 21. The outer end of thermal conductor 27 is also partially screened by anti-splash plate 30 which is placed at an angle directed toward liquid 22 for draining of condensed water. Owing to the placing of such a chamber the outer end of thermal conductor 27 will be heated substantially by vapour above the maximum filling level M. According to the present invention a time-controlled switch 40 is placed in parallel with sensor 26 to enable temporary neutralizing of the operation of sensor 26, particularly when sensor 26 makes activation of heating elements 24 impossible.

Figure 3:
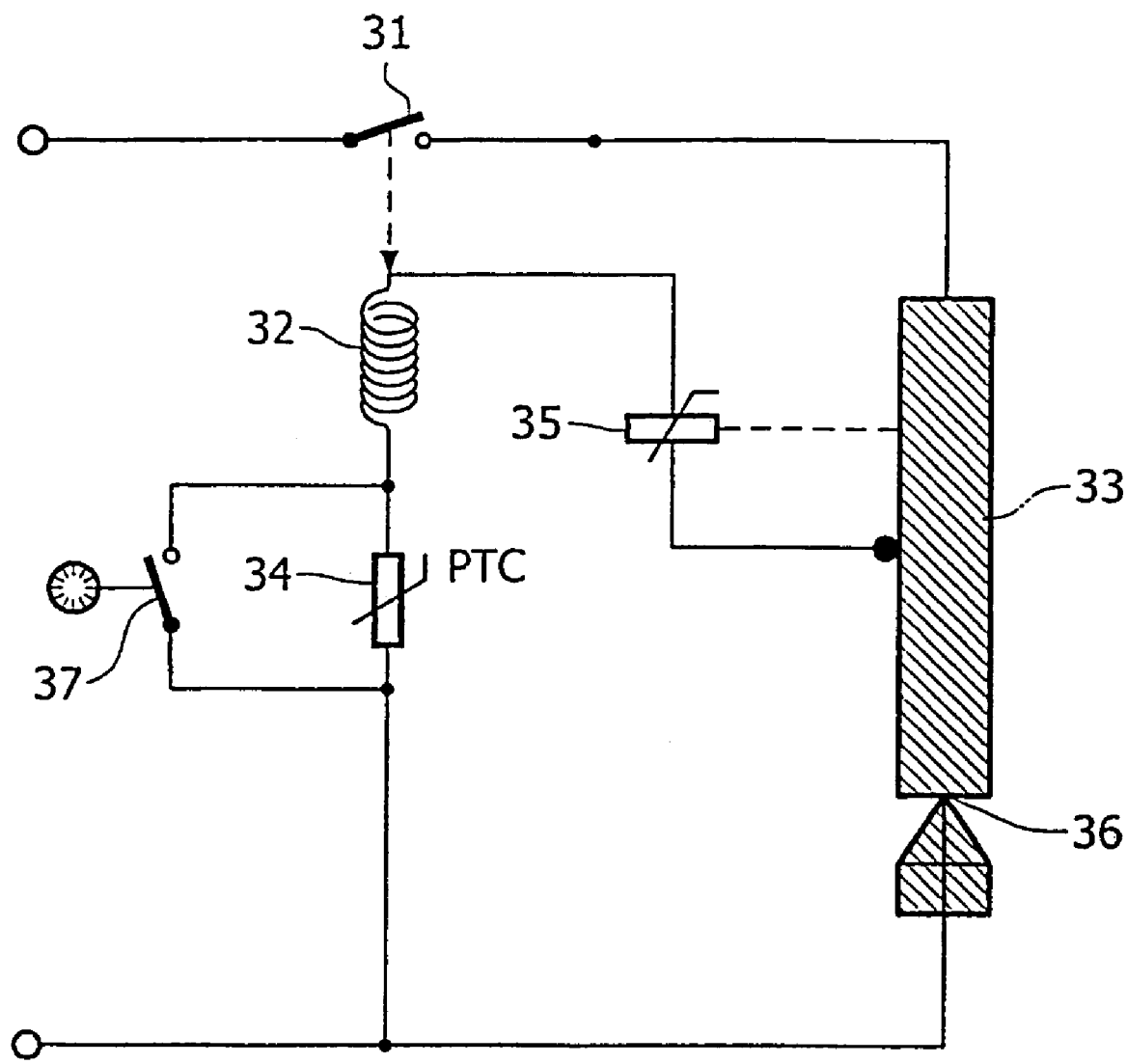
FIG. 3 shows a diagram of an electrical circuit for application in a device according to the present invention.

FIG. 3 shows a simplified electrical circuit diagram for application in a device according to the invention. Included in the circuit diagram is a switch 31 with which a user can manually close a power circuit so as to thus set a device into operation. Arranged in the circuit is a coil 32 which during passage of current generates a magnetic field which engages switch 31 and fixes switch 31 in the 'on' position. Such switches 31 (instantaneous relay switches, a relay with hand operation) are available commercially in many variations. When the power circuit is closed, current is carried through heating element 33. Heating element 33 is shown in this circuit as a resistor. The coil 32, a boiling sensor 34, formed in this case by a PTC resistor, and an overheating sensor 35 (also a PTC resistor) are connected in series in parallel with heating element 33. Overheating sensor 35 is in thermal contact with heating element 33. Boiling sensor 34 and overheating sensor 35 are both PTC resistors which, when heated, acquire a greater electrical resistance. If now the sum of resistances of boiling sensor 34 and overheating sensor 35 reaches a determined resistance value due to heating of at least one of these two thermistors, the current through the coil 32 connected in series to the thermistors will then become so small that the generated magnetic field is not strong enough to hold switch 31 in the 'on' position. Switch 31 is then carried into the 'off' position by opposing forces, for instance a mechanical spring mechanism, whereby the power supply to heating element 33 is interrupted and the heating of liquid or the overheating of heating element 33 is stopped. Should this mechanism fail unexpectedly in the case of overheating, heating element 33 is then provided, as second safety measure, with a weakened zone which will fail in the case of overheating and/or electrical overload and thus stop the overheating. If boiling sensor 34 (because of its relatively high temperature) makes activation of the heating element temporarily impossible while there is nevertheless a desire to activate heating element 33, this is temporarily possible by closing the time-controlled electric switch 37.

Figure 4:
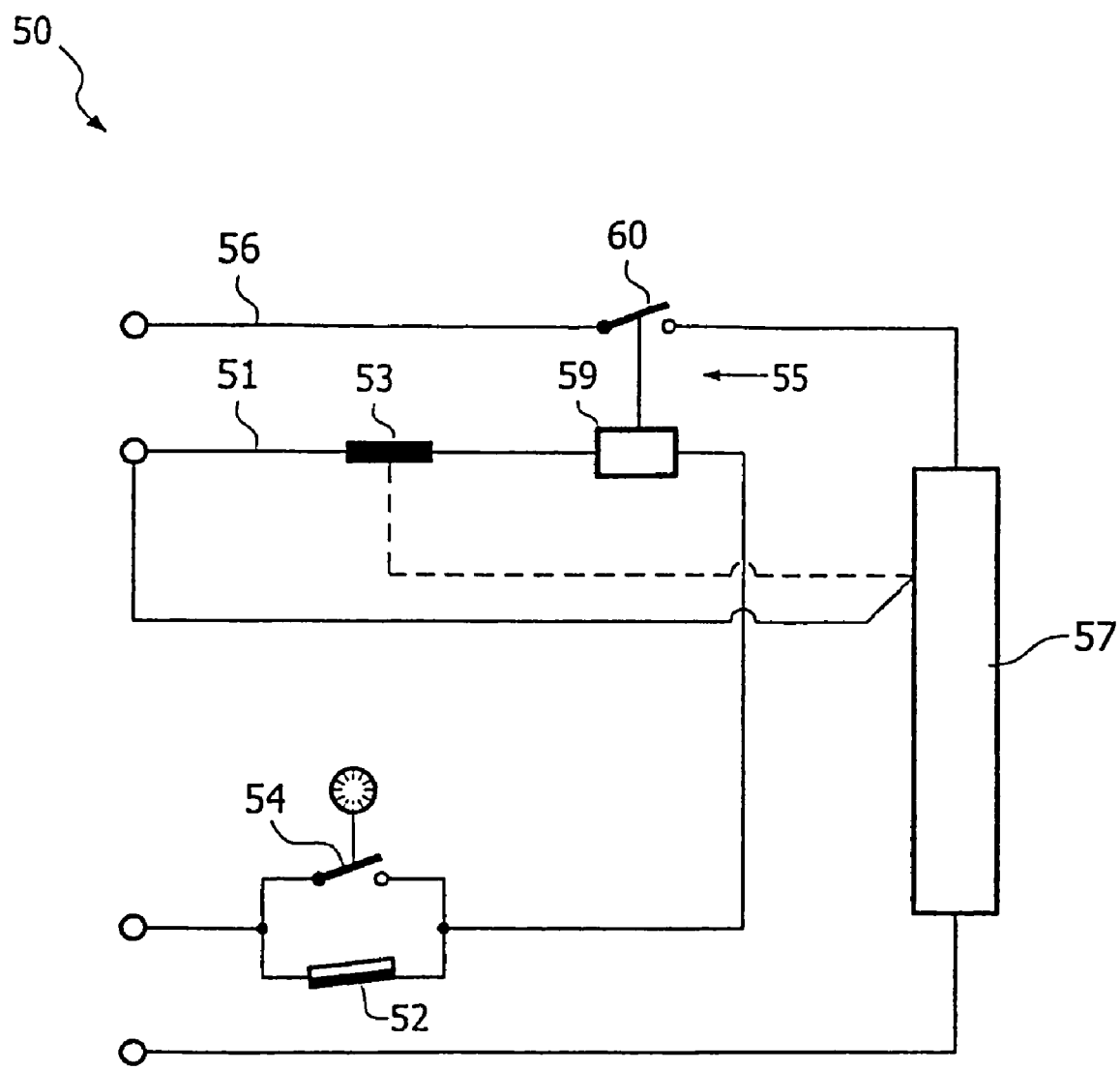
FIG. 4 shows a schematic representation of yet another alternative circuit for application in a device according to the present invention.

FIG. 4 shows a schematic representation of yet another alternative circuit 50 of a device according to the invention. A boiling sensor 52, an overheating sensor 53 and the coil 59 of a relay 55 are arranged in a first power circuit 51. A time-controlled switch 54 is placed in parallel with boiling sensor 52 to enable temporary suspension of the operation of boiling sensor 52. The first power circuit 51 operates a relay 55 with which a contact 60 placed in the second power circuit 56 can be operated. A heating element 57 is included in this second power circuit 56 so that activation or deactivation of heating element 57 can be regulated by operating the relay 55. Heating element 57 is in thermal contact (as shown by broken line 58) with overheating sensor 53. Also with reference to FIGS. 1 and 3, it is also possible for relay 55, under the influence of an energized coil 59, to permanently switch on the main current of heating element 57. If the control current then falls away, coil 59 of relay 55 loses voltage and the main current through heating element 57 will be switched off. The control therefore no longer comes into operation when the temperature drops; operation of the instantaneous switch is then necessary for this purpose.

The invention claimed is:

1. A device for heating liquids, comprising:
   a liquid container,
   at least one electrical heating element connected to the liquid container for heating liquid received in the liquid container,
   at least one boiling sensor connected to the inner side of the liquid container for detecting a boiling temperature of the liquid present in the liquid container,
   at least one overheating sensor thermally connected to the electrical heating element, and
   an electrical circuit in which the heating element, the boiling sensor and the overheating sensor are arranged such that a power supply to the heating element can be interrupted by the boiling sensor and the overheating sensor, wherein when placed in parallel with the boiling sensor in the electric circuit is a time-controlled electric switch which, upon activation of the heating element, bypasses the boiling sensor for a determined time interval, irrespective of the state of the boiling sensor.

2. The device as claimed in claim 1, wherein the time-controlled electric switch can be manually operated.

3. The device as claimed in claim 1, wherein the boiling sensor and the time-controlled electric switch placed in parallel therewith, and the coil of a relay are arranged in a first power circuit, whereby a switching contact of the relay placed in a second power circuit is actuated, in which second power circuit the heating element is also included.

4. The device as claimed in claim 3, wherein the overheating sensor is also included in the first power circuit.

5. The device as claimed in claim 1, wherein the boiling sensor and the overheating sensor both comprise at least one thermistor.

6. The device as claimed in claim 5, wherein at least one of the thermistors is a PTC resistor.

7. The device as claimed in claim 5, wherein at least one of the thermistors is an NTC resistor.

8. The device as claimed in claim 1, wherein the boiling sensor is thermally connected to the inner side of the liquid container at a location lying above a maximum liquid level of the liquid container.

9. The device as claimed in claim 8, wherein the boiling sensor is placed in a chamber connected to the liquid container such that the chamber is in communication with the liquid container above the maximum liquid level.

10. The device as claimed in claim 1, wherein the boiling sensor is screened in medium-tight manner from the liquid container.

11. The device as claimed in claim 1, wherein the boiling sensor is located outside the liquid container, and is in thermal contact with the inside of the liquid container via a thermal conductor.

12. The device as claimed in claim 1, wherein a circuit breaker for activating by means of overheating is included in a power circuit with which the electrical power is fed to the heating element.

13. The device as claimed in claim 1, wherein the boiling sensor connected to the inner side of the liquid container for detection of a boiling temperature of the liquid present in the liquid container is placed in a part of the liquid container located above the liquid.

* * * * *